United States Patent [19]

Hönel et al.

[11] Patent Number: 4,806,611

[45] Date of Patent: Feb. 21, 1989

[54] AMINOURETHANES, A PROCESS FOR THEIR PREPARATION AND THEIR USE

[75] Inventors: Michael Hönel; Peter Ziegler, both of Mainz; Gerd Walz, Wiesbaden; Rüdiger Lenz, Frankfurt am Main; Hartmut Foedde, Taunusstein; Gerhard Brindöpke, Frankfurt am Main, all of Fed. Rep. of Germany

[73] Assignee: Hoechst Aktiengesellschaft, Fed. Rep. of Germany

[21] Appl. No.: 136,903

[22] Filed: Dec. 22, 1987

[30] Foreign Application Priority Data

Dec. 24, 1986 [DE] Fed. Rep. of Germany ....... 3644370

[51] Int. Cl.$^4$ ............................................. C08G 18/80
[52] U.S. Cl. ...................................... 528/45; 528/370
[58] Field of Search ................................. 528/45, 370

[56] References Cited

FOREIGN PATENT DOCUMENTS

| | | |
|---|---|---|
| 0119769 | 12/1983 | European Pat. Off. . |
| 3617705 | 8/1986 | Fed. Rep. of Germany . |
| HOE86F159J | 12/1986 | Fed. Rep. of Germany . |
| HOE86F114 | 8/1987 | Fed. Rep. of Germany . |
| 3624454 | 12/1987 | Fed. Rep. of Germany . |
| 57202318 | 6/1981 | Japan . |
| 413824 | 12/1969 | Switzerland . |

*Primary Examiner*—Maurice J. Welsh
*Attorney, Agent, or Firm*—Bierman and Muserlian

[57] ABSTRACT

Aminourethanes, a process for their preparation and their use

The invention relates to aminourethanes composed essentially of structural units derived from (A) polyamines of the general formula (I) an/or (II

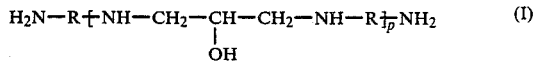

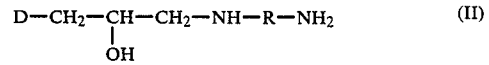

(B) if appropriate, further polyamines,
(C) compounds containing, on average, at least one terminal 2-oxo-1,3-dioxolane group per molecule and
(D) if appropriate, compounds having a monofunctional reaction, as chain stoppers.

The invention also relates to a process for the preparation of these aminourethanes and to their use, in particular in paint formulations and especially in electrodeposition paints.

22 Claims, No Drawings

AMINOURETHANES, A PROCESS FOR THEIR PREPARATION AND THEIR USE

The invention relates to curable, water dispersible binders based on reaction products formed from modified 2-oxo-1,3-dioxolanes and new polyamines which are based on derivatives, containing several amino groups, of 1,3-bis-substituted 2-propanol and which contain at least one primary amino group and, in addition, further N-basic groupings, it being possible for the binders to be deposited, in particular from an aqueous phase, in cathodic electrophoretic coating, to processes for their preparation and to their use for curable coatings and paints which can be deposited by cataphoresis on the surfaces of solid substrates, in particular metallic shaped articles, preferably steel sheet and zinc-phosphated steel.

German Pat. No. 2,252,536 describes self-crosslinking binders for cathodic electrophoretic coating which comprise a polyurethane resin which has been obtained by reacting epoxide-amine adducts, prepared from an organic compound containing epoxy groups and a secondary amine, and a partially blocked polyisocyanate. The masking agents employed are preferably primary aliphatic alcohols. In general, however, the binders must be cured at relatively high baking temperatures, for example 180° C. In addition, at least one tertiary amino group per molecule is always present in the paint film after baking, and this can adversely affect the film properties. Products of this type can, therefore, not be employed generally in any desired paint formulation.

Cathodic electrodeposition paints are also described in German Offenlegungsschriften Nos. 3,311,517 and 3,311,518, in which polyamines containing at least two primary amino groups are reacted with epoxide resins to give epoxide-amine adducts, and the resulting reaction products are caused to react with an alkylene carbonate with the formation of β-hydroxyurethanes. Although the resulting β-hydroxyurethanes in general require lower curing temperatures than the binders described above, the introduction of the primary amino groups is complicated and requires additional process stages.

Various possible means of introducing tertiary amino groups into the fundamental framework of a resin are mentioned in European patent application No. 0,119,769. As well as the reaction of epoxy compounds with amine components by various processes, the reactions of resins containing α,β-unsaturated carboxyl groups or resins containing carboxyl groups with amino components are also described. The compounds obtained are then reacted with alkylene carbonates to give binders containing β-hydroxyurethane groups. When these binders are cured, urethane or urea bonds are formed with the elimination of diols which are not physiologically harmless. A disadvantage of the reaction of epoxide compounds with ketimines is maintaining anhydrous conditions in the course of the reaction, in order to avoid premature hydrolysis.

It has now been found, surprisingly, that, using starting compounds based on derivatives, containing several amino groups, of 1,3-bis-substituted 2-propanol, curable binders of the type of aminourethanes, in particular binders which are water-dispersible and can be deposited by cataphoresis and which have unexpectedly advantageous properties, can be obtained by reaction with modified cyclic carbonates.

The invention therefore relates to aminourethanes composed essentially of structural units derived from:
(A) polyamines of the general formula (I) and/or (II)

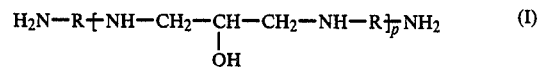

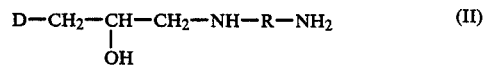

in which
R denotes $-[(CR^1R^2)_nZ^1-(CR^3R^4)_mZ^2-(CR^5R^6)_l]_k$,
Z$^1$ and Z$^2$ denote O, S, NH, N-alkyl having up to 8 carbon atoms, N-phenyl, N-monoalkylphenyl, N-dialkylphenyl or N-trialkylphenyl having 1 to 4 carbon atoms per alkyl group, a divalent phenylene radical which is optionally substituted and/or a chemical bond,
R$^1$ to R$^6$ denote H, CH$_3$, C$_2$H$_5$, phenyl or monoalkylphenyl, dialkylphenyl or trialkylphenyl having 1 to 4 carbon atoms per alkyl group,
n, m and l denote 0 to 12, preferably 0 to 6, the sum of n+m+l being ≧2, preferably ≧4,
k denotes 1 to 6, preferably 1 to 3;
p denotes 1 to 5, preferably 1 or 2; and
D denotes

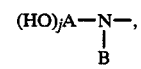

in which A represents an aliphatic radical having 2 to 5 carbon atoms, j represents 1 to 5, preferably 1 to 3, and B represents H, (C$_1$–C$_4$)-alkyl or (HO)$_j$A—,

in which G represents (C$_1$–C$_{18}$)-alkyl, preferably (C$_1$–C$_6$)-alkyl, linear or branched, or (C$_5$–C$_9$)-cycloalkyl which can be substituted by (C$_1$–C$_3$)-alkyl groups and E represents H or G, or denotes
L which represents (C$_2$–C$_8$)-alkoxy, preferably (C$_2$–C$_6$)-alkoxy, linear or branched, or (C$_5$–C$_{15}$)-acyloxy, preferably (C$_{10}$–C$_{15}$)-acyloxy,
(B) if appropriate, further polyamines,
(C) compounds containing on average at least one terminal 2-oxo-1,3-dioxolane group per molecule, and
(D) if appropriate, compounds having a monofunctional reaction, as chain-stoppers.

In comparison with the state of the art, the aminourethanes according to the invention, which can, above all, be employed as binders in paints, are obtained by a fundamentally different synthesis, without the use of isocyanates. This is effected by reacting starting compounds containing primary amino groups and further N-basic groups via their primary amino groups with modified, cyclic carbonates in such a way that basic amino groups are always present in the reaction products formed. These basic groups can be used, with the formation of salts, to disperse the products. The curing of aminourethanes according to the invention which have been dispersed in water and deposited by electrical means can be accomplished, for example, by the formation of urethane or urea bonds. The aminourethanes according to the invention can be self-curing as a result of the incorporation of masked isocyanate groups, or they can be cured by the addition of known curing agents, via the functional groups present in the binders, such as, for example, primary or secondary amino groups or hydroxyl groups.

The polyamines (A) employed in accordance with the invention, which are based on derivatives, containing several amino groups, of 1,3-bis-substituted 2-propanol and which contain at least one primary amino group and, in addition, further N-basic groupings, and the preparation thereof form the subject of German patent application No. P 3,644,371.9, filed on the same day, to which reference is hereby made.

Preferred polyamines of the above formulae (I) and (II) are those in which, in respect of R:

$Z^1$ and $Z_2$ denote O, NH, N-($C_1$-Chd 6)-alkyl or a chemical bond;

$R^1$ to $R^6$ denote H, $CH_3$ or $C_2H_5$;

n, m and l denote 0 to 3;

k denotes 1 to 3, in particular 1, and p denotes 1 or 2.

R is especially a divalent, preferably non-aromatic hydrocarbon radical which has 1 to 18 carbon atoms, preferably a branched or unbranched alkylene radical having 2 to 10 carbon atoms, in particular 2 to 6 carbon atoms, and which can be interrupted by NH groups, or is a cycloalkylene radical having 5 to 12 carbon atoms, preferably 6 to 10 carbon atoms, or is an aralkylene radical having 7 to 12 carbon atoms, preferably 8 to 10 carbon atoms.

Polymamines suitable as the component (B) to be optionally employed are preferably diprimary and can optionally contain further basic groups, such as tertiary amino groups, or, in addition, also amide groups. Examples of polyamines (B) of this type are those of the formula (III)

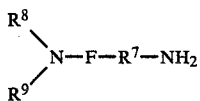
(III)

in which:

$R^7$ denotes a divalent hydrocarbon radical, preferably a linear or branched alkylene radical having 2 to 18 carbon atoms which can optionally carry inert or non-interfering groups, $R^8$ and $R^9$ are identical or different and denote hydrogen, alkyl having 1 to 8 carbon atoms or hydroxyalkyl having 1 to 8 carbon atoms in the alkyl radical, it being also possible for $R^8$ and $R^9$ to form a cyclic ring compound, and F denotes a chemical bond or —($R^7$—NH)$_r$—$R^7$—NH— in which r is 0 or an integer from 1 to 6 and $R^7$ has the above meaning.

The following may be mentioned as specific examples thereof: ethylenediamine, propylenediamine, 2-methylpentamethylenediamine, hexamethylenediamine, octamethylenediamine, triacetonediamine, dioxadecanediamine, dioxadodecanediamine and higher homologs, cycloaliphatic diamines, such as 1,4-cyclohexanediamine; 4,4'-methylene-bis-cyclohexylamine, 4,4'-isopropylene-bis-cyclohexylamine, isophoronediamine, m-xylylenediamine, N-methylethylenediamine, hydroxyethylaminoethylamine, hydroxyethylaminopropylamine, N-aminoethylpiperazine, N,N-diethylethylenediamine, N,N-diethylpropylenediamine, N,N-dihydroxyethylethylenediamine, diethylenetriamine, dipropylenetriamine, bishexamethylenetriamine, triethylenetetramine, tetraethylenepentamine, pentaethylenehexamine, heptaethyleneoctamine and the like.

Any desired materials are suitable as components (C) provided that they contain, on average, at least one, preferably two or three, 2-oxo-1,3-dioxolane groups per molecule and do not have other functional groups which could interfere with the reaction with the components (A) and optionally (B). The molecular weight $M_n$ (number average, determined by means of gel chromatography, PS standard) should, in general, be between 100 and 10,000, preferably between 150 and 3,500, and the 2-oxo-1,3-dioxolane equivalent weight should be between 100 and 1,250. The 2-oxo-1,3-dioxolane groups are preferably terminal, but in some cases it is also possible to employ, as the component (C), compounds which contain these groups in a statistical distribution over the chain of the molecule and which can be prepared by copolymerization using olefinically unsaturated compounds containing this 2-oxo-1,3-dioxolane group. A process of preparation of this type is described, for example, in German patent application No. P 3,644,373.5.

The component (C) preferably has the general formula (IV)

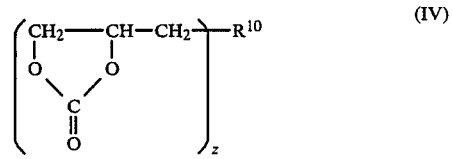

in which $R^{10}$ denotes the z-valent radical of a polyether, polyetherpolyol, polyester or polyesterpolyol which can optionally also contain ($NR^2$) groups, $R^2$ represents hydrogen, alkyl having 1 to 8 carbon atoms or hydroxyalkyl having 1 to 8 carbon atoms, or denotes a z-valent hydrocarbon radical, preferably an alkylene radical having 2 to 18 carbon atoms, which can optionally carry inert or non-interfering groups, or denotes a z-valent poly(sec.)amine radical or denotes the z-valent radical of a reaction product of an epoxy-carbonate compound with polyamines, polyols, polycaprolactonepolyols, polyesters containing OH groups, polyethers, polyglycols, hydroxy-functional, carboxyl-functional and aminofunctional polymer oils having average molecular weights from 800 to 10,000, polycarboxylic acids, hydroxy-functional or amino-functional polytetrahydrofurans and reaction products of polyamines with glycidyl esters of α,α-dialkylalkane monocarboxylic acids of the empirical formula $C_{12-14}H_{22-26}O_3$, or with glycidyl esters of versatic acid, and z denotes 1 to 5.

The index z in this formula (VI) preferably represents 2 or 3, especially 2.

Components (C) of this type are described, for example, in German patent application Nos. P 3,624,454.6 and P 3,644,370.0, to which reference is made here.

The compounds according to formula (IV), and also the compounds (V) and (VI) described below, can be prepared by an addition reaction between $CO_2$ and the corresponding compounds containing epoxide groups. Processes of this type are described, for example, in PCT(WO) patent application No. 84/03 701 and in German patent application Nos. P 3,529,263.6 and P 3,600,602.5. Reference is made here to the disclosure of the latter, including the preferred embodiments. Examples of suitable starting polyepoxides are listed in Wagner/Sarx, "Lackkunstharze" ("Synthetic Resins for Paints"), Carl Hansa Verlag (1971), page 174 et seq. and in EP published specification No. 60,506, to which reference is also made here.

Preferred starting materials for the preparation of the cyclic carbonates (IV) and the mixed epoxide-carbonate compounds (V) are the polyglycidyl ethers of polyphenols, for example bisphenol A. The glycidyl ethers are obtained, for example, by reacting a polyphenol with epichlorohydrin. Examples of polyphenols are bis-(4-hydroxyphenyl)-2,2-propane, bis-(Lb 4-hydroxyphenyl)-methane, 4,4'-dihydroxy-benzophenone, bis-(4-hydroxyphenyl)-1,1'-ether, bis-(4-hydroxyphenyl)-1,1'-isobutane, bis-(2-hydroxynaphthyl)-methane and 1,5-dihydroxynaphthalene. Preferably, free hydroxyl groups are additionally present at the epoxide groups in the polyglycidyl ether of the polyphenol.

In some cases it can be advantageous to employ flexibilized compounds as the component (C). In this case the starting materials for the preparation of the component (C) are, for example, mixed epoxide-carbonates, such as those of the general formula (V)

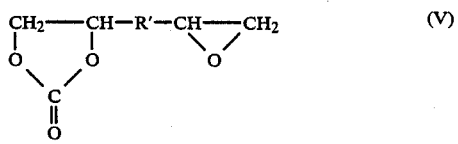

in which R' has the meaning of $R^{10}$ in formula (IV). These mixed epoxide-carbonates are reached with compounds which exert a flexibilizing effect on the molecule, for example the polyamines, which have been mentioned as component (B); further aliphatic or aromatic polyols, such as diols, triols or tetraols, for example ethylene glycol or propylene glycol, polyalkylene glycols, neopentyl glycol, glycerol, trimethylolpropane, pentaerythritol and polycaprolactonepolyols, and also polyesters and polyethers containing OH groups, polyglycols, hydroxy-functional, carboxy-functional and amino-functional polymer oils, polycarboxylic acids, hydroxy-functional and amino-functional polytetrahydrofurans, reaction products of polyamines with glycidyl ethers or with glycidyl esters of versatic acid, and polyether-polyesters containing terminal carboxyl groups. The reactions with these flexibilizing compounds are carried out under conditions in which the epoxide groups react very preferably and the cyclic carbonate groups are essentially not attacked. Compounds of the formula (IV) which carry terminal cyclic carbonate groups and which can be reacted with the amino compounds are also obtained again in this manner.

In order to limit the molecular weight of the curable compounds according to the invention, so-called chain-stoppers (D) are used in a preferred embodiment of the invention. In the case of terminal amino groups, i.e. if there is an excess of amine equivalents of (B)/(C) over 2-oxo-1,3-dioxolane equivalents, these chain-stoppers are, for example, monocarbonates, monoepoxide compounds and partially masked polyisocyanates, and the reactions can be carried out at the same time or in several separate stages. However, the reaction with these chain-stoppers can also be omitted, so that, for example, in the case of an excess of (A)/(B), the terminal groups of the aminourethane are formed from these components.

Monocarbonate compounds suitable for this purpose are those of the formula (VI)

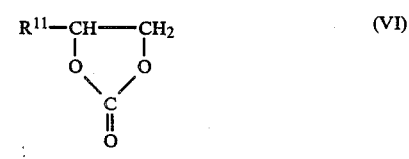

in which $R^{11}$ represents hydrogen, alkyl having 1 to 18, preferably 1 to 10, carbon atoms, or radicals of the glycidyl ester of versatic acid, glycidyl esters of glycidyl ethers in which the epoxide group has been converted into cyclic carbonates in the manner indicated earlier in the text.

As well as the monocarbonates and monoepoxides, it is also possible to employ partially masked polyisocyanates, since these compounds react first with a free $NH_2$ group. In principle, it is possible to use any amine reaction which takes place preferably at the primary amino group before the secondary amino groups present in the molecule react. The compound employed for chain termination can, in addition, also be used to flexibilize the resulting paint film by incorporating appropriate long-chain compounds which are known in the art.

In the case of terminal 2-oxo-1,3-dioxolane groups, examples of chain-stoppers which can be used under the reaction conditions are monofunctional amines. Suitable amines of this type are, for instance, mono-primary amines, such as methylamine, ethylamine, propylamine, butylamine, octylamine, laurylamine, stearylamine, ethanolamine, isononyloxypropylamine, aminoethylethanolamine, neopentanolamine, 3-aminopropanol, amide-amines formed from di-primary amines and monocarboxylic acids, monoketimines of di-primary amines and the like. The amines according to formula (II) above can also be used for this purpose.

The ratios of the components (A), (C) and, if appropriate, (B)/(D) can vary within wide limits. In general, the amount of component (A) will be 5 to 60 mol %, preferably 10 to 50 mol %, that of component (B) will be 0 to 60 mol %, preferably 20 to 40 mol %, that of component (C) will be 20 to 70 mol %, preferably 25 to 60 mol %, and that of component (D) will be 0 to 70 mol %, preferably 20 to 40 mol %. It is preferable to employ these components in amounts such that the ratio of the 2-oxo-1,3-dioxolane equivalents to the reactive amine equivalents of the components (A)/(B) is between 0.8 and 1.2 mol %, preferably 1.0 and 1.1 mol %.

The aminourethanes according to the invention preferably have the formula (VII)

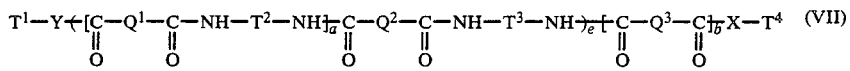 (VII)

in which:
a, b and e denote a number from 0 to 5, preferably 1 to 3,
b being $\geq 1$ if e is 0, and 0 being $\leq a$ and $b \leq 5$ if e is $\geq 1$,
X denotes —HN—M—NH—, if $b \geq 1$, or denotes a chemical bond if b is 0,
Y denotes —HN—M—NH—, or denotes a chemical bond if $T^1$ has the meaning indicated below under $T^1$3), M denotes

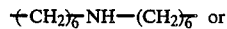

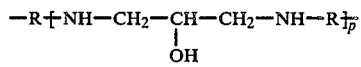

in which R and p have the same meanings as in formula (I),
$T^1$ and $T^4$, which can be identical or different, denote
(a)

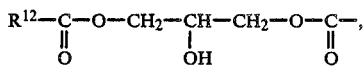

in which $R^{12}$ is $(C_5-C_{15})$-alkyl, preferably branched, or
(b)

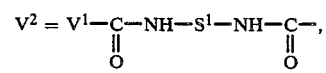

wherein $V^1$ denotes an organic radical of an H-active compound of the formula $H—V^1$ belonging to the group comprising aliphatic, cycloaliphatic, alkyl-aromatic monohydric alcohols or monohydric alcohols substituted by N-heterocyclic structures, the alcohols preferably having 1-15 carbon atoms, or comprising $(C_2-C_5)$ alcohols which are substituted by amino groups, $(C_1-C_6)$-alkoxy groups, phenoxy groups or substituted phenoxy groups, or comprising the oximes of aliphatic $(C_3-C_8)$ ketones, or heterocyclic N-H-acid compounds having up to 8 carbon atoms, or C-H-acid compounds having up to 8 carbon atoms, and $S^1$ represents a 2,4-disubstituted and/or 2,6-disubstituted toluylene radical or the methylenetrimethylcyclohexyl radical of the formula

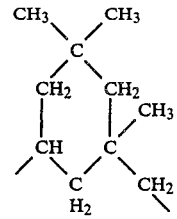

or
(c) a radical of the formulae (Ia) or (IIa), subject to the proviso that each of X or Y in formula (VII) represents a chemical bond and b is $\geq 1$,

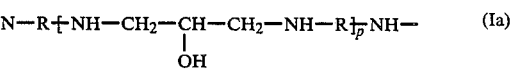 (Ia)

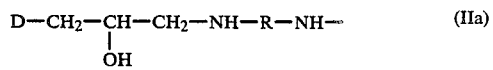 (IIa)

in which R, D and p have the same meanings as in formulae (I) and (II), or
(d)

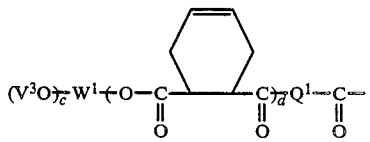

in which c is 1-3, d is 0 or 1, $V^3$ is hydrogen or $V^2$, $V^2$ having the meaning indicated above under (b), $W^1$ is a divalent to tetravalent radical from the group comprising linear or branched aliphatic polyester-alcohols having average molecular weights of up to 1,000, or radicals of trimethylolpropane, pentaerythritol, ethylene glycol, propylene glycol or trihydroxy-functional polycaprolactone, or
(e) $T^1$ is hydrogen if Y is —HN—M—NH—, and $T^4$ is hydrogen if b is 0 and X represents a chemical bond,
$T^2$ and $T^3$ are M or a linear aliphatic polyether radical having an average molecular weight of up to 400, it being possible for $T^2$ and $T^3$ to be identical or different,
$Q^1$ and $Q^3$ are

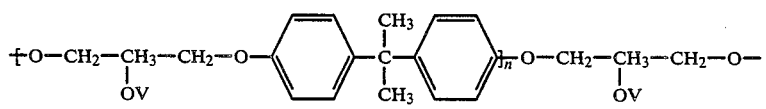

in which n is 1-3, it being possible for $Q^1$ and $Q^3$ to be identical or different, $V^3$ is hydrogen or $V^2$, $V^2$ having the meaning indicated above under (b), and
$Q^2$ is

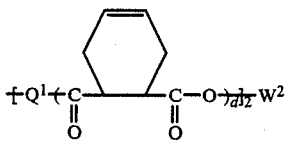

in which d is 0 or 1 and $W^2$ is a divalent radical belonging to the group comprising linear aliphatic polyester-alcohols having average molecular weights of up to 2,000, or linear or branched aliphatic polyethers having average molecular weights of up to 2,000.

In the aminourethanes according to the invention some or all of the hydroxyl groups present and/or some of the amino groups can have been reacted with partially masked polyisocyanates.

Aminourethanes which are particularly interesting in this regard are those in which, additionally, primary or secondary amino groups are present, since in these products, if they contain masked polyisocyanate groups, the proportion of nitrogen groupings having a basic reaction remaining in the molecule after curing is markedly reduced.

The molecular weight $\overline{M}_n$ (number average; determined by means of gel chromatography, polystyrene standard) of the curable compounds according to the invention is, in general, between 500 and 20,000, preferably between 1,000 and 10,000. The Staudinger Index $[\eta]$ has in most cases values from 0.5 to 2.0 [dl/g], determined in methoxypropanol. The amine numbers are in most cases 10 to 300 mg of KOH/g, preferably 20 to 100 mg of KOH/g.

The invention also relates to a process for the preparation of the aminourethanes according to the invention.

The invention also relates to curable mixtures (coating agents) which contain the aminourethanes according to the invention and which contain, if appropriate, curing agents and catalysts in addition, if appropriate further customary formulation components, if appropriate pigments and dyestuffs and, if appropriate, further polymers, binder resins and extenders.

The invention also relates, in particular, to curable coating agents which are water-dilutable and can be deposited by cataphoresis and contain the aminourethanes according to the invention as binders, salt-forming solubilizers, if appropriate additional curing agents and catalysts, if appropriate further customary formulation components, if appropriate pigments, dyestuffs and corrosion inhibitors, if appropriate further binder resins, if appropriate further polymers and, if appropriate, extenders.

The curable compounds according to the invention are prepared by reacting the components (A), (C) and, preferably, (D) and, if appropriate, (B) in addition.

The reaction of the components (A) and (C) is carried out, in general, in the required stoichiometric ratios or amounts by customary methods at elevated temperatures, for example 20° to 150° C., preferably 50° to 100° C., if appropriate with the addition of suitable catalysts, such as, for example, aluminum trialkyls or n-butyllithium, and, preferably, with the addition of inert solvents. When assessing the starting products stoichiometrically and also the reaction products in respect of the progress of the reaction, the factors taken as a basis are, in the case of the compounds of components (A)/(B), the amine number, which can be determined in a customary manner by titration with perchloric acid, and, in the case of the compounds of component (C), the cyclocarbonate equivalence number, which can be determined in a customary manner by titration with KOH. The reaction is, in general, continued until, for example, a constant amine number has been reached in the reaction product according to the invention and until the cyclocarbonate content has fallen to nil.

In the reaction, according to the invention, of the components (A)/(B) and (C), the polyamino compounds according to the invention can be added on their own or as mixtures or successively during the course of the reaction, if appropriate dissolved in inert organic solvents. In this regard it should be noted that the polyamino compounds of the formula (I) are amines having two primary amino groups in the molecule, whereas the polyamino compounds of the formulae (II) are amines having only one primary amino group in the molecule. Analogously, it is also possible to add single, or a variety of, modified cyclic carbonates of component (C) to the reaction on their own or as mixtures or also successively, preferably as a mixture with inert organic solvents. A particularly preferred inert organic solvent in this respect is diglycol dimethyl ether (=DMDG).

It is important in the reaction according to the invention that the reaction and process conditions maintained should always be conditions under which the cyclocarbonate groups of component (C) can only react with the primary amino groups of components (A)/(B), which can be achieved by known methods without corresponding reactions also taking place to an interfering extent with the secondary amino groups present, which are known to be slower to react.

The following may be mentioned here as examples of inert (i.e. not interfering with the reaction) solvents for the above reaction: halogenated hydrocarbons (less suitable when used as dipping paint), ethers, such as diethyl ether, 1,2-dimethoxyethane, DMDG, tetrahydrofuran or dioxane; ketones (if a component (C) is used), such as, for example, acetone, methyl ethyl ketone, methyl isobutyl ketone, cyclohexanone and the like; alcohols, such as methanol, ethanol, 2-butoxyethanol, propanol, isopropanol, 2-methoxy-1-propanol, butanol and benzyl alcohol, butyldiglycol and hexylglycol; esters (less suitable when used as dipping paint), such as butyl acetate, ethylglycol acetate or methoxypropyl acetate; N-methylpyrrolidone, (cyclo)aliphatic and/or aromatic hydrocarbon, such as hexane, heptane, cyclohexane, benzene, toluene, the various xylenes and aromatic solvents within the boiling range from approx. 150° to 180° C. (higher-boiling mineral oil fractions, such as (R)Solvesso). The solvents can be employed on their own as a mixture.

In the preparation of the polyamino compounds of the formulae (I) and (II) employed in accordance with the invention as component (A), bis-primary amines or mixtures thereof with monoamines are reacted with propane derivatives, preferably epichlorohydrin, glycidyl esters of versatic acid or 2-ethylhexyl glycidyl ether. Epichlorohydrin is particularly preferred. In regard to further details, reference should be made to the German patent application mentioned, P No. 3,644,371.9.

If the aminourethanes according to the invention are intended to have self-curing properties, a fraction of the hydroxyl groups and/or primary or secondary amino groups present are reacted with a partially blocked polyisocyanate which still contains, on average, approx. one free isocyanate group in the molecule. Another possible means consists, for example, in introducing β-hydroxyalkylcarbamate groups by reacting a fraction of the amino groups with a cyclic carbonate, such as ethylene carbonate. This method is described, for example, in German Offenlegungsschrift No. 3,246,812 and EP Published Specification No. 119,769.

For example, the component (C) can first be reacted with the partially blocked isocyanate and after this the synthesis of the resin can be carried out by reaction with the component (A) and, if appropriate, (B) and (D). The component (C) can be employed for this purpose in the unflexibilized or flexibilized form. The reaction of the hydroxyl groups and/or secondary amino groups present in component (C) with the partially masked isocyanate is carried out under conditions such that the cyclic carbonate groups are not attacked. On the other hand, it is, however, also possible first to synthesize the curable compound completely and then to introduce the masked isocyanate groups subsequently into the finished product.

Any desired polyisocyanates can be employed for these compounds, for example an aliphatic, cycloaliphatic or aromatic polyisocyanate. Some of the isocyanate groups can have been reacted in a known manner with customary masking agents. The following are typical examples of the polyisocyanates used: xylylene diisocyanate, 4,4'-diphenylmethane diisocyanate, 4,4'-triphenylmethyl triisocyanate, triphenylmethane triisocyanate, polyphenylpolymethyl isocyanate, 2,2,4(2,4,4)-methylcyclohexyl diisocyanate, dicyclohexylmethyl diisocyanate, diethylcyclohexyl isocyanate, bis-(3-methyl-4-isocyanatocyclohexyl)-methane, 2,2-bis-(4-isocyanatocyclohexyl)-propane, the methyl ester of lysine of diisocyanate, the biuret of hexamethylene diisocyanate, diisocyanates of dimeric acids, 1-methylbenzene-2,4,5-triisocyanate, 2,4,4'-biphenyl triisocyanate, the triisocyanate formed from 3 moles of hexamethylene diisocyanate and 1 mole of water, containing 16% of NCO, and further compounds containing at least two NCO groups per molecule, preferably isophorone diisocyanate, hexamethylene diisocyanate and trimethylhexamethylene diisocyanate and tetramethylhexamethylene diisocyanate, but especially 2,4-toluylene diisocyanate or 2,6-toluylene diisocyanate or mixtures of these compounds. The masked polyisocyanates present in the aminourethanes can be identical or different.

As well as these simple polyisocyanates, polyisocyanates containing heteroatoms in the radical linking the isocyanate groups are also suitable. Examples of these are polyisocyanates containing carbodiimide groups, allophonate groups, isocyanate groups, urethane groups, acylated urea groups or biuret groups.

Suitable polyisocyanates are, finally, also the known prepolymers containing terminal isocyanate groups, such as are accessible, in particular, by reacting the above-mentioned simple polyisocyanates, above all diisocyanates, with excess amounts of organic compounds having at least two groups which are reactive towards isocyanate groups. Preferably, however, these prepolymers are employed as external curing components in extraneously crosslinking systems.

Suitable masking agents are aliphatic, cycloaliphatic or alkyl-aromatic (monohydric) alcohols, for example lower aliphatic alcohols, such as methyl alcohol, ethyl alcohol, the various propyl, butyl and hexyl alcohols, heptyl alcohol, octyl alcohol, nonyl alcohol, decyl alcohol and the like, and also unsaturated alcohols, such as allyl alcohols, cycloaliphatic alcohols, such as cyclopentanol or cyclohexanol, alkyl-aromatic alcohols, such as benzyl alcohol, methylbenzyl and p-methoxybenzyl and p-nitrobenzyl alcohol, and monoethers of glycols, such as ethylene glycol monoethyl ether, ethylene glycol monobutyl ether and the like. Other masking agents are ketoximes having 3 to 20 carbon atoms, preferably 3 to 10 carbon atoms, such as methyl ethyl ketone oxime (=butanone oxime), acetoxime, cyclohexanone oxime, heptanone oxime and octanone oxime, CH-acid compounds, such as alkyl esters of malonic acid, acetoacetic esters and cyanoacetic esters having in each case 1 to 4 carbon atoms in the ester group, NH-acid compounds, such as caprolactam, and amino alcohols, such as diethylethanolamine. Phenol, which is known as a blocking agent, can be employed in cases where the reaction product will be used for the preparation of paints containing solvents.

The reaction products according to the invention can be prepared by several process variants. For example, an aminourethane of the formula (VII) in which $Q^1$ or $Q^3$ represents, for example, the radical from the diglycidyl ether of bisphenol A, can be obtained from the components (A)/(B) and (C) by, for example, preparing the component (C) required as a precursor by converting the epoxide groups of the diglycidyl ether mentioned into carbonate groups with the formation of a compound of the formula (IV) in which $R^{10}$ represents a divalent bis-(4-hydroxyphenyl)-2,2-propane radical. This compound of the formula (IV) is then reacted with one or more polyamino compounds of the component (A) and, if appropriate, (B) in the desired stoichiometric ratio.

If it is desired to obtain a self-curing product, the compound of the formula (IV) can first be reacted via the OH groups present with a partially masked polyisocyanate with the formation of a urethane, after which the reaction with the said polyamino compounds is carried out. It is also possible first to react partially masked polyisocyanates with an aminoalkylation product which contains, on average, at least one NH group per molecule and which has been obtained from phenol and/or a substituted phenol, preferably a monoalkylphenol or monoarylphenol or monoaralkylphenol, having one or, if desired, two phenolic hydroxyl groups, a primary alkylamine and/or primary alkanolamine and-/or primary-tertiary alkyldiamine and formaldehyde or a compound which splits off formaldehyde, and to react the product in a further reaction stage with a mixed epoxide-carbonate (cf. formula (V) above), i.e. a compound in which starting epoxide groups are still present as well as cyclic carbonate groups. In this way compounds having two cyclic carbonate groups of the formula (IV) are obtained once more.

On the other hand, however, it is also possible to add a customary curing agent to the aminourethanes according to the invention. The following are examples of curing agents suitable for this purpose: masked polyisocyanates, for instance those described above for the self-curing aminourethanes, and also β-hydroxyesters of at least bifunctional polycarboxylic acids, reaction products of dialkyl malonates with aldehydes and ketones which react, with the elimination of water, to form unsaturated dicarboxylic acid esters (the Knoevenagel synthesis), transesterification or transamidation curing agents and Michael addition reaction products, for example those described in German Offenlegungsschriften Nos. 3,315,469 and 3,417,441 and also in German patent application P 3,602,981. Reference is made herewith to these literature references, including the preferred embodiments. Aminoplast(urea or melamine) resins and phenoplast resins and also β-hydroxyalkylcarbamate crosslinking agents should also be mentioned here.

Suitable curing components for the aminourethanes according to the invention, preferably in nonaqueous paints, are also compounds containing epoxide groups, such as, for example, low-molecular polyepoxides, copolymers containing epoxide groups and diglycidyl or polyglycidyl ethers of aliphatic or aromatic alcohols. Curing components which should also be mentioned here are oligomeric or polymeric compounds containing at least two 1,3-dioxolan-2-one groups or at least one 1,3-dioxolan-2-one group and one epoxide group per molecule; these include, for example, the compounds (I) and (II).

The amount of these crosslinking agents depends on the nature and number of mutually reactive groups in the binder and crosslinking agent and on the desired density of crosslinking. In most cases the ratio by weight between the binder and the crosslinking agent is between 1:10 and 10:1, preferably 1:5 to 5:1 and very preferably 1:1.

In order to impart the necessary flexibilization to the paint film obtained using the reaction products according to the invention, it is possible for the components (A)/(B) and (C) to provide the preconditions required, on the other hand it is also possible to introduce the necessary flexibilization into the system either via the incorporated curing agent in the form of partially masked polyisocyanates or via the curing agent which is mixed in.

In addition to paint formulations having a conventional composition, the aminourethanes according to the invention are also preferably used, for example, for the preparation of aqueous systems which produce coatings having very good properties. In particular, they are suitable for electrodeposition, although they can also be used for other coating processes, such as brushing, spraying, dipping, curtain coating, doctor blade coating etc. To obtain aqueous formulations it is advantageous to neutralize the basic amino groups partly or completely by the addition of acids or of other substances having a neutralizing action, in order thereby to obtain coating compositions which can be electrodeposited from an aqueous solution at a bath pH between about 3 and 9.

Neutralization of the basic groups in the aminourethanes according to the invention is generally effected by means of water-soluble acids, for example formic acid, acetic acid, lactic acid or phosphoric acid. The amount of acid added depends, in the individual case, on the properties of the resin used and is generally carried only far enough to enable the resin to be solubilized or dispersed.

Aqueous formulations having a particularly low content of volatile organic solvents are obtained, for example, by distilling off, from the preparation or solution, the solvents present in the binders, such as, for example, isopropanol, 1-methoxy-2-propanol or isopropyl methyl ketone. It is preferable to carry out this process step under reduced pressure.

It is also possible, if appropriate, to add various additives, such as pigments, pigment pastes, dyestuffs, curing agents, catalysts, antioxidants, (UV) stabilizers, surface-active agents, anticorrosion agents, extenders, solvents, leveling and thickening agents, reactive thinners and the like, to the paint formulations containing the aminourethanes according to the invention. It is also possible to add polymers and other paint resins. These additives are known and are customarily employed in the paint industry. The electrophoretic deposition of the paint particles from the aqueous paint formulations is carried out by cataphoresis in accordance with known processes, and reference is made here thereto. The deposition can be carried out on any electrically conducting substrate, preferably, for example, on metals, such as steel, copper, aluminum, zinc-phosphated steel, metal alloys and metal laminates.

Examples of catalysts suitable for accelerating the curing are salts or complexes of metals, such as, for example, lead, zinc, iron, tin, manganese and bismuth. Preferred metal catalysts in this respect are lead compounds, such as lead carboxylates having 1 to 10 carbon atoms, for example lead formate, lead acetate, lead propionate, lead lactate, lead octoate, lead acetylacetonate etc. or tin compounds. Compounds which are preferably suitable for tin catalysts are dibutyltin dilaurate and dibutyltin oxide or tin(IV) compounds of the formula (VIII)

$$[(R^{12})_r Sn)_s (K)_t]_u \qquad (VIII)$$

in which $R^{12}$ denotes an alkyl radical having 1 to 10 carbon atoms, preferably 2 to 4 and also 8 carbon atoms, K denotes a monobasic or dibasic carboxyl radical having 1 to 12, preferably 1 to 8 and also 12 carbon atoms or a monohydric or dihydric alcohol or (poly)amine radical having 1 to 10 carbon atoms, or a mononuclear or polynuclear phenolic radical (substituted or unsubstituted), for example p-tert.-butylphenol, p-nonylphenol etc., or radicals of monohydric or dihydric thiols, or denotes nil;

r denotes 2 or 3;
s denotes 1 or 2;
t denotes 1 or 2; and
u ≧ 1.

Examples of representatives of this formula are tin-(IV) compounds which hydrolyze relatively rapidly in water, such as dialkyl(butyl)tin diacetate.

In most cases the catalysts are employed in amounts of 0.1 to 6% by weight, preferably 0.2 to 3% by weight (calculated on metal), relative to the curable compound (solids basis).

If dibutyltin dilaurate is used as the curing catalyst, this is advantageously first homogenized with the binder, and this homogeneous mixture is then subsequently added to the paint formulation.

In the case of dibutyltin oxide, this is preferably first mixed with the pigment and, if appropriate, an admixed resin, and the mixture is then fed to the grinding operation. The aim is a pigment/binder ratio (PBR) of approx. 0.2:1 to 1:1, and pigmentation can, in principle, be carried out in two ways:

(1) the pigments are added to the neutralized binder and the mixture is ground through a bead mill or another suitable grinding unit;

(2) the neutralized binder(s) (dispersions) are pigmented with a highly pigmented (PBR=6:1 to 20:1) pigment paste.

In general, the pigment paste contains a paste resin, pigments, extenders, other auxiliaries customary in paints and, if appropriate, the catalysts mentioned above.

In all cases the grinding of the binder/pigment mixture or the pigment paste should be carried out to give adequately small particle sizes (for example Hegmann 7), preferably in the presence of $Al_2O_3$ (corundum) beads or ceramic or $ZrO_2$ beads (diameter 0.5-3 mm).

In the case of tin compounds according to formula (VIII) above, such as dibutyltin diacetate, which can be hydrolyzed relatively easily, it is advantageous first to incorporate this compound into the aqueous pigment paste, which can also contain an admixed resin, and, in the course of this, also to carry out an appropriate comminution (for example Hegmann 7). This pigment paste is then added to the paint containing the binder. Alternatively, it is possible to meter these tin compounds straight into the paint already containing pigments, if appropriate in stages, with vigorous mechanical mixing such as is available, for instance, in a bead mill using corundum (ceramic) beads. In a modification, at first only a (minor) part of the total water is present in the paint, whereas the other (major) part is only added after this tin compound has been metered into the paint. It is also possible to add the tin compound as a mixture with an admixed resin and/or with part of the pigment.

After deposition, the coating is cured by customary processes at elevated temperatures which, in general, depend on the nature of the curing component, temperatures from 100° to 220°, preferably 130° to 180° C., being used. The use of customary lead catalysts is, surprisingly, particularly effective in the curing of aminourethanes according to the invention if these paint resins contain polyisocyanate radicals masked with, for example, $\beta$-alkoxy alcohols or $\beta$-dialkylamino alcohols and/or with ketone oximes, and it can result in shorter curing times or in lower baking temperatures accompanied at the same time by very good flow, very good film formation and surface formation and very good adhesion to the substrate in the paints and coatings. This behavior is particularly important when vehicle bodies which have already been partly finished and are therefore sensitive to heat are being painted. The coats of paint or coatings which have been prepared and cured using paints according to the invention, deposited by cataphoresis, on steel sheet, in particular on zinc-phosphated steel sheet, also display an unexpectedly advantageous behavior in the salt spray corrosion test.

In the Examples below, parts denote parts by weight and % denotes percent by weight. The amine numbers relate in all cases to solid resin.

EXAMPLES

I. Amine preparation

Example 1

Preparation of technical 1,3-bis-(6-aminohexyl)amino-2-propanol. (Polyamine mixture of the formula (I) in which R is —$(CH_2)_6$— and p is 1 and also, as byproduct, constituents in which p is 2).

463 g (5 mol) of epichlorohydrin are added dropwise under an atmosphere of nitrogen to a mixture of 2,325 g (20 mol) of hexamethylenediamine, 2 liters of toluene and 410 g (5.1 mol) of 50% strength aqueous sodium hydroxide solution in a stirred reactor at 37 to 42° C.; with cooling by means of ice water this takes about 2 hours. The mixture is stirred for a further 1.5 hours at not higher than 45° C. and for 20 minutes at 55° C. The water is then removed azeotropically from the system and, after 5 g of "Celite" have been added, the precipitated sodium chloride is filtered off at about 95° C. The toluene is removed by distillation from the filtrate, and the excess hexamethylenediamine is then distilled off under 20 mm Hg until a bottom temperature of 150° C. is reached. The residue, which should not be exposed to the air until it is below 100° C., is a pale yellowish melt which solidifies on cooling to room temperature to give a whitish solid and which constitutes the desired polyamine mixture mentioned above of the formula (I).

Yield: 1,260 g (=87% of theory, relative to epichlorohydrin).

Melting range: 50°–53° C.

Amine number: 782 mg of KOH/g (calculated: 779).

Example 2

Preparation of a polyamine mixed compound of the formula (I) in which R is —$(CH_2)_6$— and —$C_6H_9(CH_3)_3$— and p is 1–2 (systematic name: trimethylhexyl-1,3-bis-(6-aminohexyl)-amino-2-propanol).

463 g (5 mol) of epichlorohydrin are added dropwise under nitrogen, analogously to the instructions in Example 1, to a mixture of 1,162 g (10 mol) of hexamethylenediamine, 1,582 g (10 mol) of trimethylhexamethylenediamine, 1.5 liters of toluene and 410 g (5.1 mol) of 50% strength sodium hydroxide solution in the apparatus described in Example 1. The reaction is carried out as described in Example 1, but the excess of amine is removed by distillation until a bottom temperature in the reaction mixture of 175° C. under 20 mm Hg is reached. The residue forms, at room temperature, a whitish melt which turns cloudy and is slightly syrupy and has an amine number of 680 mg of KOH/g. The amine number corresponds to the theoretical value for the desired reaction product. The yield is 1,485 g (=90% of theory).

Example 3

Preparation of a polyamine mixed compound of the formula (I) in which R is 13 $(CH_2)_6$—, —$C_6H_9(CH_3)_3$— and —$(CH_2)_6NH(CH_2)_6$— and p is 1–2.

Preparation is carried out analogously to Example 2, but concomitantly using 6,6'-iminobishexylamine in addition.

A mixture of 344 g (1.6 mol) of 6,6'-iminobishexylamine, 92.9 g (0.8 mol) of hexamethylenediamine and 126.5 g (0.8 mol) of trimethylhexamethylenediamine in 300 ml of toluene and 66 g (0.82 mol) of 50% strength sodium hydroxide solution is reacted under nitrogen with 74 g (0.8 mol) of epichlorohydrin in the apparatus, and following the instructions, of Example 1. The reaction is carried out as described in Example 1, and the excess of amine is removed by distillation until a bottom temperature of 180° C. under 20 mm Hg is reached. The reaction product obtained is a composition which is viscous at room temperature and which, in addition to the desired polyamine mixed compound, also contains the unreacted fraction of 6,6'-iminobishexylamine, which, however, does not adversely affect the use of the product in accordance with the invention.

Yield: 431 g (=86.5% of theory).

Amine number: 705 mg of KOH/g (calculated: 720).

Example 4

Preparation of a polyamine mixed compound of the formula (II) in which R is —(CH$_2$)$_6$— and —C$_6$H$_9$(CH$_3$)$_3$— and L is branched (C$_{10}$–C$_{15}$)-acyloxy.

260 g (1 mol in terms of epoxide content) of commercially available "Cardura" E 10 (=glycidyl ester of the commercially available versatic acid [mainly 2,2-dimethylundecanoic acid]) are added dropwise under an atmosphere of nitrogen to a mixture of 290 g (2.5 mol) of hexamethylenediamine, 360 g (2.5 mol) of trimethylhexamethylenediamine and 600 ml of toluene at about 50° C. in a stirred apparatus as described in Example 1, and the mixture is stirred further, while the reaction is continued at a maximum of 70° C., until epoxide determination gives a nil value. When the solvent and the excess amine have been distilled off (bottom temperature up to 175° C. under 20 mm Hg), 396 g (=virtually 100% of theory) of the desired reaction product are obtained in the form of a yellowish oil. Amine number: 289 mg of KOH/g (calculated: 283).

Example 5

Preparation of a polyaminopolyol of the formula (II) in which R is —(CH$_2$)$_6$— and —C$_6$H$_9$(CH$_3$)$_3$—, A is —(CH$_2$)$_2$—, j is 1 and B is —C$_2$H$_4$OH.

185.2 g (2 mol) of epichlorohydrin are added dropwise under an atmosphere of nitrogen to 420.6 g (4 mol) of diethanolamine in 240 g of isopropanol at 33°–37° C. in a stirred apparartus, and the reaction mixture is then kept at this temperature until the epoxide content has fallen to 0. In the course of this, the amine number must not fall below 175 mg of KOH/g. The resulting reaction product is used as a "precursor" and is added dropwise under an atmosphere of nitrogen to a mixture of 696 g (6 mol) of hexamethylenediamine and 948g (6 mol) of trimethylhexamethylenediamine in 1 liter of toluene and 160 g (2 mol) of 50% strength aqueous sodium hydroxide solution at 38°–42° C. in a stirred apparatus. When the reaction is complete, isopropanol/water and then isopropanol/toluene are removed by distillation up to the boiling point of toluene, the precipitated NaCl is removed by filtration and the residual toluene and the excess amine are then removed by distillation up to a bottom temperature of 175° C. under 20 mm Hg. This leaves 977 g (=82% of theory) of the desired reaction product in the form of an orange-colored oil.

Amine number: 535 mg of KOH/g (calculated: 564).

Example 6

Polyaminopolyol of the formula (II) in which R is —(CH$_2$)$_6$— and —C$_6$H$_9$(CH$_3$)$_3$—, B is H, A is branched C$_4$-alkyl and j is 3.

121.2 g (1 mol) of trisbuffer (=tris-(hydroxymethyl)-methanamine) in 400 g of methanol are boiled under reflux while 92.5 g (1 mol) of epichlorohydrin are added in the course of 30 minutes. Stirring is continued at 60° C. for a further 50 minutes, approx., until the epoxide determination gives a nil value, but the amine number does not fall below 90 mg of KOH/g. The resulting reaction product is used as a "precursor" and is added dropwise under an atmosphere of nitrogen to a mixture of 348 g (3 mol) of hexamethylenediamine and 474 g (3 mol) of trimethylhexamethylenediamine in 40 g (1 mol) of sodium hydroxide in 300 ml of methanol at 38°–42° C. in a stirred apparatus. The methanol is then distilled off, 600 ml of toluene are added and the water of reaction is removed by azeotropic distillation. The precipitated NaCl is then filtered off and the toluene and the excess amine are removed by distillation (bottom temperature up to 175° C. under 20 mm Hg). This leaves 249 g (=79% of theory) of the desired reaction product in the form of a yellowish oil. Amine number: 528 mg of KOH/g (calculated: 536).

The reactions described below under Section II. and Section III. in Examples 7 to 14 and 15 to 19 and also in Comparison Example 1, for the preparation of precursors or binders are carried out in a reactor whose temperature can be regulated, equipped with a stirrer, a reflux condenser, an internal thermometer and a metering device.

II. PREPARATION OF PRECURSORS

Example 7

Preparation of half-masked polyisocyanate.

174 parts by weight of toluylene diisocyanate (=2 equivalents of NCO; 80% by weight of 2,4-isomer and 20% by weight of 2,6-isomer) are mixed at 30°–70° C. with 137 parts by weight of 2-ethylhexanol (=1.05 equivalents of OH) in the presence of 0.3% by weight of benzyltrimethylammonium hydroxide (="Triton" B) or in the presence of 0.1% by weight of zinc acetylacetonate as catalyst, and the mixture is reacted until it has an NCO value of approx. 12.8% by weight.

Example 8

Preparation of completely masked polyisocyanates by reacting half-masked polyisocyanate with bis-cyclocarbonates containing hydroxyl groups.

615 parts by weight (=2 mol) of the half-masked polyisocyanate prepared in accordance with Example 7 are added slowly at 30°–80° C. to 1,759 parts by weight of a bis-cyclocarbonate containing 2 equivalents of OH groups (=2 equivalents of cyclic carbonate, 60% strength by weight in diglycol dimethyl ether [=DMG]), preparation based on commercially available Epicote 1001, and are reacted, with the OH groups of the bis-carbonate, in the presence of 0.3% by weight of "Triton" B until an NCO value of approx. 0% by weight is reached. The resulting reaction product is obtained as a 70% strength by weight solution in DMDG and has a carbonate equivalent weight of approx. 832, i.e. 832 g of solid substance contain 1 equivalent of cyclic carbonate.

Example 9

Example 8 is repeated, but 2,808 parts by weight of flexibilized bis-cyclocarbonate (=2 equivalents of cyclic carbonate, 70% strength by weight in DMDG) which contains 2 equivalents of OH groups per mol of bis-cyclocarbonate and has been obtained in accordance with Example 13, are employed analogously instead of 1,759 parts by weight of the bis-cyclocarbonate based on "Epicote" 1001. The resulting reaction product has a highly viscous to wax-like consistency. It is obtained in the form of a 70% strength by weight solution in DMDG and has a carbonate equivalent weight of approx. 983, i.e. 983 g of solid substance contain 1 equivalent of cyclic carbonate.

Example 10

Example 8 is repeated, but 3,194 parts by weight of flexibilized bis-cyclocarbonate (=2 equivalents of cyclic carbonate, 70% strength by weight in DMDG) which contains 2 equivalents of OH groups per mol of bis-cyclocarbonate and has been obtained in accordance with Example 14, are employed analogously instead of 1,759 parts by weight of the bis-cyclocarbonate based on "Epicote" 1001. The resulting reaction product has a highly viscous to wax-like consistency. It is obtained as a 70% strength by weight solution in DMDG and has a carbonate equivalent weight of approx. 1,118, i.e. 1,118 g of solid substance contain 1 equivalent of cyclic carbonate.

Example 11

Preparation of flexibilized dicarboxylic acids from long-chain diols and tetrahydrophthalic anhydride.

830 parts by weight (=2 equivalents of OH groups) of commercially available "Capa" 205 (=polycaprolactonediol, molecular weight approx. 830, made by Interox, England) are mixed with 304 parts by weight (=2 mol) of tetrahydrophthalic anhydride, and the mixture is reacted at 80°-120° C. in the presence of approx. 0.3% by weight of triethylamine until the reaction product has an acid number of approx. 100 mg of KOH/g of solid substance.

Example 12

1,100 parts by weight (=2 equivalents of OH groups) of commercially available "Pluriol" 3100 (=polypropylene glycol diol, molecular weight approx. 1,100, made by BASF AG) are mixed, analogously to Example 11, with 304 parts by weight (=2 mol) of tetrahydrophthalic anhydride, and the mixture is reacted at 80°-120° C. in the presence of approx. 0.3% by weight of triethylamine until the reaction product has an acid number of approx. 80 mg of KOH/g of solid substance.

Example 13

Preparation of flexibilized bis-cyclocarbonates containing hydroxyl groups from monoepoxy-monocyclocarbonates and flexibilized dicarboxylic acids by means of the epoxidecarboxylic acid reaction.

832 parts by weight of a monoepoxy-monocyclocarbonate (=2 equivalents of epoxide) based on commercially available "Epicote" 828 (=the diglycidyl ether of bisphenol A) are heated to approx. 60°-80° C. and, in the presence of 0.2-0.4% by weight of the commercially available chromium catalyst AMC-2 (100% strength by weight, made by Cordova Chemicals, USA), are run into a mixture of 1,134 parts by weight of flexibilized dicarboxylic acid (=2 equivalents of HOOC groups), prepared in accordance with Example 11, and 220 parts by weight of DMDG. The reaction mixture is allowed to react at 80°-120° C. until an acid number of <5 and an epoxide number of <0.1 have been reached. The resulting reaction product is obtained as an approx. 90% strength by weight solution in DMDG and is subsequently diluted to a content of 70% by weight of reaction product by the addition of approx. 620 parts by weight of DMDG. The yield of the desired flexibilized bis-cyclocarbonate is virtually 100%.

Example 14

Example 13 is repeated, but 1,404 parts by weight of flexibilized dicarboxylic acid (=2 equivalents of HOOC groups), prepared in accordance with Example 12, and 250 parts by weight of DMDG are employed analogously instead of 1,134 parts by weight of flexibilized dicarboxylic acid from Example 11 and 220 parts by weight of DMDG, and the reaction is completed as described in Example 13. The resulting reaction product is obtained as an approx. 90% strength by weight solution in DMDG and is subsequently diluted to a content of 70% by weight of reaction product by the addition of approx. 708 parts by weight of DMDG. The yield of the desired flexibilized bis-cyclocarbonate is virtually 100%.

III. PREPARATION OF BINDERS (AMINOURETHANES)

Preparation of binders from polyamines and bis-cyclocarbonates.

Example 15

A mixture of 608 parts by weight of a mono-cyclocarbonate (=2 equivalents of carbonate) based on versatic acid glycidyl ester, 4,737 parts by weight of bis-cyclocarbonate (=4 equivalents of carbonate, 70% strength by weight in DMDG), prepared in accordance with Example 8, 2,489 parts by weight of bis-cyclocarbonate (=1.32 equivalents of carbonate, 70% strength by weight in DMDG), prepared in accordance with Example 9, and 1,395 parts by weight of bis-cyclocarbonate (=0.68 equivalent of carbonate, 70% strength by weight in DMDG), prepared in accordance with Example 10, is reacted at 60°-90° C. with a mixture of 330 parts by weight of polyamine (=2 equivalents of NH$_2$), prepared in accordance with Example 2, and 645 parts by weight of bishexamethylenetriamine (=6 equivalents of NH$_2$), dissolved in 2,493 parts by weight of methoxypropanol as solvent. The resulting reaction product is obtained as a 60% strength by weight highly viscous solution of binder resin. The amine number of the resin is approx. 37 mg of KOH/g of solid resin.

Example 16

A mixture of 298 parts by weight of polyaminopolyol (=1 equivalent of NH$_2$), prepared in accordance with Example 5, 397 parts by weight of polyamine (=1 equivalent of NH$_2$), prepared in accordance with Example 4, and 430 parts by weight of 6,6'-iminobishexylamine (=4 equivalents of NH$_2$), dissolved in 2,136 parts by weight of methoxypropanol, is run into a mixture of 4,737 parts by weight of bis-cyclocarbonate (=4 equivalents of carbonate, 70% strength by weight in DMDG), prepared in accordance with Example 8, 3,018 parts by weight of bis-cyclocarbonate (=1.64 equivalents of carbonate, 70% strength by weight in DMDG), prepared in accordance with Example 9, and 732 parts by weight of bis-cyclocarbonate (=0.36 equivalent of carbonate, 70% strength by weight in DMDG), prepared in accordance with Example 10, and the reaction mixture is reacted at 60°-90° C. until an amine number of approx. 40 mg of KOH/g of solid resin has been reached. The resulting reaction product is obtained as a 60% strength by weight highly viscous solution of binder resin.

Example 17

A mixture of 624 parts by weight of polyamine (=4 equivalents of NH$_2$), prepared in accordance with Example 3, 397 parts by weight of polyamine (=1 equivalent of NH$_2$), prepared in accordance with Example 4, and 314 parts by weight of polyaminopolyol (=1 equivalent of NH$_2$), prepared in accordance with Example 6, dissolved in 2,286 parts by weight of methoxypropanol, is run into a mixture of 4,737 parts by weight of bis-cyclocarbonate (=4 equivalents of carbonate, 70% strength by weight in DMDG), prepared in accordance with Example 8, 2,576 parts by weight of bis-cyclocarbonate (=1.4 equivalents of carbonate, 70% strength by weight in DMDG), prepared in accordance with Example 9, and 1,231 parts by weight of bis-cyclocarbonate (=0.6 equivalent of carbonate, 70% strength by weight in DMDG), prepared in accordance with Example 10, and the reaction mixture is reacted at 60°–90° C. until an amine number of approx. 54 mg of KOH/g of solid resin has been reached. The resulting reaction product is obtained as a 60% strength by weight highly viscous solution of binder resin.

Example 18

A mixture of 1,664 parts by weight of monoepoxy-monocyclocarbonate (=4 equivalents of epoxide) based on "Epicote" 828 (=the diglycidyl ether of bisphenol A), 1,080 parts by weight of Capa 305 (=6 equivalents of OH) ("Capa" 305 is a polycaprolactonetriol, molecular weight approx. 540), 830 parts by weight of Capa 205 (=2 equivalents of OH) ("Capa" 205 is a polycaprolactonediol, molecular weight approx. 830) and 1,507 parts by weight of DMDG is reacted at 70°–140° C. in the presence of approx. 0.3% by weight of $BF_3.(C_2H_5)_2O$, or at 50°–100° C. in the presence of approx. 0.1 to 0.3% by weight of $BF_3.CH_3COOH$, until an epoxide number of approx. 0 has been reached. After approx. 0.3% by weight of zinc acetylacetonate has been added as a catalyst, 1,866 parts by weight of half-masked polyisocyanate (=6 equivalents of NCO), prepared in accordance with Example 7, are metered into the resulting solution at 30°–80° C., and the mixture is allowed to react until an NCO value of approx. 0 has been reached. 2,620 parts by weight of a bis-cyclocarbonate containing completely masked polyisocyanate groups (=4 equivalents of carbonate), 80% strength by weight in DMDG), based on Epicote 1001 and prepared in accordance with Example 8, are then mixed into the resulting mixture, 576 parts by weight of polyamine (=4 equivalents of $NH_2$), prepared in accordance with Example 1, and 352 parts by weight of 4,7-dioxadecane-1,10-diamine (=4 equivalents of $NH_2$), dissolved in 1,596 parts by weight of methoxypropanol are then run in at 60°–90° C. and the reaction mixture is reacted at 60°–90° C. until an amine number of approx. 26.5 mg of KOH/g of solid resin has been reached. The resulting reaction product is obtained as a 60% strength by weight highly viscous solution of binder resin.

Example 19

Precursors:

(I) 124 parts by weight (=1.05 equivalents of OH) of butylglycol and 1 part by weight of triethylamine are run, in the course of 1 hour and at 20° to 40° C., into 174 parts by weight (=2 equivalents of NCO) of toluylene diisocyanate (=80% by weight of the 2,4-isomer and 20% by weight of the 2,6-isomer), and the mixture is then allowed to react until an NCO value of approx. 13 to 14% by weight has been reached, thereby affording a half-masked polyisocyanate.

(II) 415 parts by weight (=1 equivalent of OH) of Capa 205, 550 parts by weight (=1 equivalent of OH) of "Pluriol" 3100 and 4 parts by weight of triethylamine are mixed with 304 parts by weight (=2 mol) of tetrahydrophthalic anhydride, and the mixture is reacted at 80° to 120° C. until an acid number of approx. 88 mg of KOH/g of solid resin has been reached. 832 parts of a monoepoxy-monocyclocarbonate (=2 equivalents of epoxide), based on "Epicote" 828, are added to 1,269 parts by weight of the flexibilized dicarboxylic acid (=2 equivalents of COOH) thus obtained, and the mixture is heated to approx. 60°–80° C. and, after 0.2 to 0.4% by weight of the chromium catalyst AMC-2 and 3,512 parts by weight of DMDG have been added, is allowed to react until an epoxide number of approx. 0 and an acid number of 5 have been reached. This mixture is cooled to approx. 30° C. and 1,759 parts by weight of a bis-cyclocarbonate (=2 equivalents of carbonate, 60% strength by weight in DMDG), based on Epicote 1001, are added slowly. 2,384 parts by weight of half-masked polyisocyanate (=8 equivalents of NCO), prepared as for precursor I, are then added, and the mixture is reacted at 30° to 80° C. in the presence of 0.3% by weight of "Triton" B until an NCO value of approx. 0% by weight has been reached. 608 parts by weight (=2 equivalents of carbonate) of a mono-cyclocarbonate based on versatic acid glycidyl ester are then added. The mixture thus obtained contains approx. 60% by weight of solid resin and can be directly processed further.

Binders:

A mixture of 660 parts by weight of polyamine (=4 equivalents of $NH_2$), prepared in accordance with Example 2, and 430 parts by weight of bishexamethylene-triamine (=4 equivalents of $NH_2$) in 727 parts by weight of 1-methoxy-2-propanol is added slowly, at 60° to 110° C., to 10,364 parts by weight of the resin mixture composed of precursor II (=8 equivalents of carbonate, 60% strength by weight in DMDG), and the reaction is continued until an amine number of approx. 46 mg of KOH/g of solid resin has been reached. The resulting reaction product is obtained as a 60% strength by weight highly viscous solution of binder resin.

Comparison Example 1

Binders:

860 parts by weight of bishexamethylenetriamine (=8 equivalents of $NH_2$) in 573 parts by weight of 1-methoxy-2-propanol are added slowly, at 60° to 100° C. to 10,364 parts by weight of the resin mixture composed of precursor II in Example 19 (=8 equivalents of carbonate, 60% strength by weight in DMDG), and the reaction is continued until am amine number of approx. 31.7 mg of KOH/g of solid resin has been reached. The resulting reaction product is obtained as a 60% strength by weight highly viscous solution of binder resin.

(D) Use of the binders

Preparation of paint formulations and the use thereof, in particular for electrophoretic coating, and testing and characterizing the layers and coatings prepared therefrom.

Example 20

Clear laquers are prepared in accordance with batch A below from each of the binder resins obtained in Examples 15 to 19 and in Comparison Example 1.

Batch A:
- 334 parts by weight of binder resin solution (60% strength by weight) from one of Examples 15 to 19,
- X parts by weight of 10% strength aqueous fromic acid, corresponding to the amount indicated in Table 1, calculated on the binder resin (=solid resin) and
- 10 parts by weight of dibutyltin dilaurate.

The constituents in batch A are vigorously mixed together, and the solids content is adjusted to approx. 15% by weight by subsequently mixing in completely demineralized water, with the formation of an aqueous emulsion. The resulting emulsion is subjected to cataphoretic deposition in an open glass vessel. Zinc-phosphated steel sheet is used as the cathode and bright steel sheet, at a distance of 5 to 15 cm from the cathode, is used as the anode. The deposition time is 2 minutes. The voltages applied in each case, the film thicknesses achieved and the properties of the films deposited, and subsequently cured (baking conditions: temperature of object 160° C. for 20 minutes) are shown in a summarized form in Table 1 for the films formed from the binder resins of Examples 15 to 19 and Comparison Example 1.

there, and the solids content of the resulting mixture of batch C is adjusted to approx. 18% by weight by subsequently mixing in completely demineralized water, with the formation of an aqueous emulsion. The resulting emulsion is subjected to cataphoretic deposition in an open glass vessel. Zinc-phosphated steel sheet is used as the cathode and bright steel sheet, at a distance of 5 to 10 cm from the cathode, is used as the anode.

The deposition time is 2 minutes. The voltages applied, the film thickness achieved and the properties of the film deposited and subsequently cured (baking conditions: temperature of object 160° C. for 20 minutes) are shown in summarized form in Table 2.

TABLE 1

|  | Batch A, containing binder resin from Example No. | | | | | Comparison Example 1 |
|---|---|---|---|---|---|---|
|  | 15 | 16 | 17 | 18 | 19 |  |
| Parts by weight of 10% strength by weight formic acid in batch A | 41.4 | 36.8 | 46 | 32.2 | 46 | 40 |
| pH of the aqueous cataphoresis bath | 7.0 | 6.2 | 5.5 | 6.5 | 6.0 | 6.0 |
| Maximum starting voltage (Volt) | 300 | 250 | 250 | 350 | 350 |  |
| Deposition voltage[1] (Volt) | 250 | 200 | 200 | 300 | 280 |  |
| Properties of the cured film: |  |  |  |  |  |  |
| Film thickness (μm) | 20 | 18 | 18 | 24 | 20 |  |
| Leveling[2] | 1–2 | 2–3 | 2–3 | 0–1 | 1 |  |
| Adhesion[2] | 0 | 1–2 | 2–3 | 0 | 1 |  |
| Crosslinking[3] | >100 | >100 | >100 | >100 | >100 |  |
| Indentation[4] | >160 | >120 | >100 | >160 | >160 |  |

[1] at 26–30° C.
[2] 0 ... best value  5 ... worst value
[3] double wiping with MEK at 1 kg applied load, number of double wipings
[4] inch-pounds, as specified by ASTM

Example 21

The binder resin prepared in accordance with Example 18 is used to prepare a pigmented paint as specified in batches B and C below.

Batch B (pigment composition):
  84 parts by weight of titanium dioxide (Kronos RN 59 made by Kronos-Titangesellschaft, Leverkusen),
  1 part by weight of carbon black (Raven 1170 made by Columbian Carbon, Hamburg),
  10 parts by weight of aluminum silicate (Lanco ASP 200 made by Langer, Ritterhude) and
  5 parts by weight of lead silicate (EP 202 made by Chemag, Frankfurt a.M.).

Batch C:
  750 parts by weight of binder resin solution (60% strength by weight) from Example 18,
  180 parts by weight of pigment mixture from batch B,
  19 parts by weight of lead octoate, or 22.5 parts by weight of dibutyltin dilaurate,
  46 parts by weight of 10% strength by weight formic acid,
  9 parts by weight of anticrater additive (Additol VXW 4922/280 made by Hoechst AG),
  9 parts by weight of leveling agent (Additol VXL 1339 made by Hoechst AG) and
  18 parts by weight of 2,2,4-trimethyl-1,3-pentanediol monoisobutyrate.

The binder resin solution to be tested from Example 18 is ground, together with the pigment mixture from batch B in the ratio indicated in batch C, to a particle size of <5 μm in a triple roll mill. The resulting mixture is completed in accordance with the formulation of batch C by mixing in the further components indicated

TABLE 2

| Emulsion from batch C containing binder resin from Example 18 | Level of pigmentation (binder resin:pigment) = 1:0.4 (parts by weight) |
|---|---|
| pH of the cataphoresis bath | 6.6 |
| Maximum starting voltage (Volt) | 350–400 |
| Deposition voltage[1] (Volt) | 300 |
| Properties of the cured film: |  |
| Film thickness (μm) | 22 |
| Leveling[2] | 0 |
| Adhesion[2] | 0 |
| Crosslinking[3] | >100 |
| Indentation[4] | 120–140 |
| Erichsen indentation (mm) | 8–9 |

[1] to [4] as in Table 1

Example 22

The binder resin prepared in accordance with Example 18 is used to prepare a pigmented paint as specified in batches D and E below.

Batch D (pigment composition):
  56 parts by weight of titanium dioxide ("Kronos" RN 59 made by Kronos-Titangesellschaft, Leverkusen),
  1 part by weight of carbon black ("Raven" 1170 made by Columbian Carbon, Hamburg),
  10 parts by weight of aluminum silicate ("Lanco" ASP 200 made by Langer, Ritterhude),
  5 parts by weight of lead silicate (EP 202 made by Chemag, Frankfurt) and 28 parts by weight of dibutyltin oxide (item No. 803,539, Merck, Darmstadt)

Batch E:
- 750 parts by weight of binder resin solution (60% strength by weight) from Example 18,
- 180 parts by weight of pigment mixture from batch D,
- 46 parts by weight of 10% strength by weight formic acid,
- 9 parts by weight of anticrater additive ("Additol" VXW 4922/280 made by Hoechst AG),
- 9 parts by weight of leveling agent ("Additol" VXL 1339 made by Hoechst AG) and
- 18 parts by weight of 2,2,4-trimethyl-1,3-pentanediol monoisobutyrate.

The binder resin solution to be tested from Example 18 is ground, together with the pigment mixture from batch D in the ratio indicated in batch E, to a particle size of <5 μm in a bead mill. The resulting mixture is completed in accordance with the formulation of batch E by mixing in the further components indicated there, and the solids content of the resulting mixture of batch E is adjusted to approx. 18% by weight by then mixing in completely demineralized water, with the formation of an aqueous emulsion. The resulting emulsion is subjected to cataphoretic deposition in an open glass vessel. Zinc-phosphated steel sheet is used as the cathode, and bright steel sheet, at a distance of 5 to 10 cm from the cathode, is used as the anode.

The deposition time is 2 minutes. The voltages applied, the film thickness achieved and the properties of the film deposited and subsequently cured (baking conditions: temperature of object 160° C. for 20 minutes) are shown in summarized form in Table 3.

TABLE 3

| Emulsion from batch E containing binder resin from Example 18 | Level of pigmentation (binder resin:pigment) = 1:0.4 (parts by weight) |
|---|---|
| pH of the cataphoresis bath | 6.7 |
| Maximum starting voltage (Volt) | 350–400 |
| Deposition voltage[1] (Volt) | 300 |
| Properties of the cured film: | |
| Film thickness (μm) | 20 |
| Leveling[2] | 0 |
| Adhesion[2] | 0 |
| Crosslinking[3] | 100 |
| Indentation[3] | 120–140 |
| Erichsen indentation (mm) | 8–9 |

[1] to [4] as in Table 1

Example 23

In addition to direct pigmentation (Examples 21 and 22), the binders according to the invention can also be pigmented by means of a pigment paste (batch F).

Batch F (pigment paste):
- 6.71 parts by weight of paste resin (90% strength; SWE 5219 made by Vianova, Graz),
- 1.46 parts by weight of lactic acid (45% strength),
- 21.47 parts by weight of completely demineralized water,
- 4.82 parts by weight of lead silicate paste (75% strength; "Heucoflow" made by Heubach, Langelsheim),
- 1.31 parts by weight of carbon black ("Printex" 25 made by Degussa, Frankfurt),
- 11.81 parts by weight of dibutyltin oxide (Item No. 803,539 of Merck, Darmstadt) and
- 52.40 parts by weight of titanium dioxide ("Kronos" RN 59 made by Kronos-Titangesellschaft, Leverkusen).

The paste resin, the lactic acid and the water are homogenized. The remaining components of the formulation are added to this mixture. The batch is ground to a particle size of <5 μm by means of a bead mill.

Batch G:
- 750 parts by weight of binder resin solution (60% by weight) from Example 18,
- 46 parts by weight of formic acid (10% by weight),
- 9 parts by weight of anticrater additive ("Additol" VXW 4922/280 made by Hoechst AG),
- 9 parts by weight of leveling agent ("Additol" VXL 1339 made by Hoechst AG),
- 18 parts by weight of 2,2,4-trimethyl-1,3-pentanediol monoisobutyrate and
- 260 parts by weight of pigment paste from batch F, completely demineralized water.

A clear coat of approx. 55% strength by weight is prepared by means of a dissolver from the binder to be tested from Example 18, the formic acid and the additives, using an appropriate amount of completely demineralized water. The amount of pigment paste (batch F) indicated in batch G is dispersed in this clear lacquer. Finally, the solids content of the bath is adjusted to 18% by weight using completely demineralized water.

The resulting emulsion is subjected to cataphoretic deposition in an open glass vessel. Zinc-phosphated steel sheet is used as the cathode, and bright steel sheet, at a distance of 5 to 10 cm from the cathode, is used as the anode.

The deposition time is 2 minutes. The voltages applied, the film thickness achieved and the properties of the film deposited and subsequently cured (baking conditions: temperature of object 160° C. for 20 minutes) are shown in summarized form in Table 4.

TABLE 4

| Emulsion from batch G containing binder resin from Example 18 | Level of pigmentation (binder resin:pigment) = 1:0.4 (parts by weight) |
|---|---|
| pH of the cataphoresis bath | 5.8 |
| Maximum starting voltage (Volt) | 370–400 |
| Deposition voltage[1] (Volt) | 300 |
| Properties of the cured film: | |
| Film thickness (μm) | 22 |
| Leveling[2] | 0 |
| Adhesion[2] | 0 |
| Crosslinking[3] | 100 |
| Indentation[4] | 140–160 |
| Erichsen indentation (mm) | 8–9 |

[1] to [4] as in Table 1

Example 24

In the case of the cataphoresis immersion coatings which cure by deblocking masked polyisocyanates, it is preferable, according to the present state of the art, to carry out curing by means of lead or zinc catalysts (for example lead octoate or dibutyltin dilaurate). In the case of systems having β-alkoxy alcohols or β-dialkylamino alcohols (primary or secondary), the use of lead catalysts proves particularly advantageous. It has now been found, surprisingly, that the polyamines according to the invention (as such or as a constituent of a resin) has a high affinity for Pb(II) ions, compared with known amines, and, consequently, during the cataphoretic deposition of the resin these ions form complexes with the resin in an unexpectedly stable manner and in a surprisingly great amount, so that finally adequate amounts of Pb(II) are present in the deposited film in a uniform distrubution. The following tests on model substances are carried out in order to prove this advantages behavior of amines according to the invention:

(a) An aqueous suspension of $PbSO_4$, which is sparingly soluble, is converted into a clear solution by adding a polyamine mixture, according to the invention, of the formula (I) from Example 1.

(b) A resin model (aminourethane) is prepared by reacting the polyamine according to the invention from Example 1 with 2 equivalents of propylene carbonate. The aminourethane thus obtained (amine number=228) can be utilized in the same manner as described above under (a) for dissolving $PbSO_4$ dispersed in water.

(c) A binder resin prepared analogously to Example 19 using the polyamine according to the invention from Example 1 is compared in the following manner with an analogous binder resin from Comparison Example 1 which does not, however, contain the polyamine according to the invention: comparable cataphoresis paints are formulated from each of the resins with added lead octoate, and are immediately deposited on bonderized sheets. Without being cured, the deposited paint films are stripped off by means of 1/1 ethylene glycol/acetone. After the organic material has been digested, the lead concentration is determined polarographically in each case. The paint film having the polyamine according to the invention contains on average 65 ppm of Pb, whereas the paint film having bishexamethylenetriamine and no polyamine according to the invention contains on average only 10 ppm of Pb. This result is unexpected and extremely surprising.

In regard to aspects of the principles of stable complexing of Pb(II) ions in solution, reference can be made to Gmelin 47, Pb [C] 1699 et seq.

We claim:

1. An aminourethane composed essentially of structural units derived from
(A) polyamines of the formula (I) and/or (II)

$$H_2N-R+NH-CH_2-CH-CH_2-NH-R\}_{\overline{p}}NH_2 \quad (I)$$
$$\qquad\qquad\qquad\qquad |$$
$$\qquad\qquad\qquad\qquad OH$$

$$D-CH_2-CH-CH_2-NH-R-NH_2 \quad (II)$$
$$\qquad\qquad |$$
$$\qquad\qquad OH$$

in which
R denotes $\{(CR^1R^2)_{\overline{n}}Z^1\{(CR^3R^4)_{\overline{m}}Z^2\{(CR^5R^6)_{\overline{l}}]_k$,
$Z^1$ and $Z^2$ denote O, S, NH, N-alkyl having up to 8 carbon atoms, N-phenyl, N-monoalkylphenyl, N-dialkylphenyl or N-trialkylphenyl having 1 to 4 carbon atoms per alkyl group, a divalent phenylene radical which is optionally substituted and/or a chemical bond,
$R^1$ to $R^6$ denote H, $CH_3$, $C_2H_5$, phenyl or monoalkylphenyl, dialkylphenyl or trialkylphenyl having 1 to 4 carbon atoms per alkyl group,
n, m and l denote 0 to 12, the sum of n+m+l being $\geq 2$,
k denotes 1 to 6;
p denotes 1 to 5; and D denotes
(1)

$$(HO)_jA-N-,$$
$$\qquad\qquad |$$
$$\qquad\qquad B$$

in which A represents an aliphatic radical having 2 to 5 carbon atoms, j represents 1 to 5, and B represents H, $(C_1-C_4)$-alkyl or $(HO)_jA-$, (2)

$$G-N-,$$
$$\quad |$$
$$\quad E$$

in which G represents $(C_1-C_{18})$-alkyl, or $(C_5-C_9)$-cycloalkyl which can be substituted by $(C_1-C_3)$-alkyl groups and E represents H or G, or denotes (3) L which represents $(C_2-C_8)$-alkoxy, or $(C_5-C_{15})$-acyloxy, (B) if appropriate, further polyamines,
(C) compounds containing on average at least one terminal 2-oxo-1,3-dioxolane group per molecule, and
(D) if appropriate, compounds having a monofunctional reaction, as chain-stoppers.

2. An aminourethane as claimed in claim 1, wherein, in the formulae (I)/(II),
$Z^1$ and $Z^2$ denote O, NH, $N-(C_1-C_6)$-alkyl or a chemical bond;
$R^1$ to $R^6$ denote H, $CH_3$ or $C_2H_5$;
n, m and l denote 0 to 6;
k denotes 1 to 3; and
p denotes 1 or 2.

3. An aminourethane as claimed in claim 1, wherein R represents a divalent hydrocarbon radical which has 1 to 18 carbon atoms and which can be interrupted by NH groups.

4. An aminourethane as claimed claim 1, wherein R represents a radical from a compound of the group comprising 1,6-hexanediamine in which the methyl groups are optionally substituted, in addition, by one or two methyl or ethyl groups, trimethylhexamethylenediamine, 2-methylpentanediamine, 2-ethylbutanediamine, 6,6'-iminobishexylamine, 4,7-dioxadecane-1,10-diamine, 4,9-dioxadecane-1,12-diamine, 4,7,10-trioxatridecane-1,13-diamine or polyoxypropylenediamine having an average molecular weight of approx. 200–400.

5. An aminourethane as claimed in claim 1, wherein the polyamines (B) have the formula (III)

$$R^8 \qquad\qquad\qquad (III)$$
$$\quad \diagdown$$
$$\qquad N-F-R^7-NH_2$$
$$\quad \diagup$$
$$R^9$$

in which:
$R^7$ denotes a divalent hydrocarbon radical, preferably a linear or branched alkylene radical having 2 to 18 carbon atoms which can optionally carry inert or non-interfering groups,
$R^8$ and $R^9$ are identical or different and denote hydrogen, alkyl having 1 to 8 carbon atoms or hydroxyalkyl having 1 to 8 carbon atoms in the alkyl radical, it being also possible for $R^8$ and $R^9$ to form a cyclic ring compound, and F denotes a chemical bond or —(R$^7$—NH)$_r$—R$^7$—NH— in which r is 0 or an integer from 1 to 6 and R$^7$ has the above meaning.

6. An aminourethane as claimed in claim 1, wherein the compounds (C) have the formula (IV)

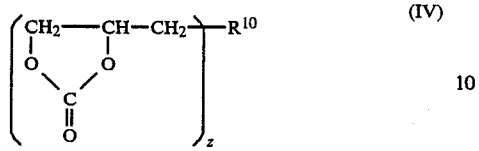
(IV)

in which
R$^{10}$ denotes the z-valent radical of a polyether, polyetherpolyol, polyester or polyesterpolyol which can optionally also contain (NR$^2$) groups, R$^2$ representing hydrogen, alkyl having 1 to 8 carbon atoms or hydroxyalkyl having 1 to 8 carbon atoms, or
denotes a z-valent hydrocarbon radical, preferably an alkylene radical having 2 to 18 carbon atoms, which can optionally carry inert or non-interfering groups, or
denotes a z-valent poly(sec.)amine radical or
denotes the z-valent radical of a reaction product of an epoxy-carbonate compound with polyamines, polyols, polycaprolactonepolyols, polyesters containing OH groups, polyethers, polyglycols, hydroxy-functional, carboxyl-functional and amino-functional polymer oils having average molecular weights from 800 to 10,000, polycarboxylic acids, hydroxy-functional or amino-functional polytetrahydrofurans and reaction products of polyamines with glycidyl esters of α,α-dialkylalkane monocarboxylic acids of the empirical formula C$_{12-14}$H$_{22-26}$O$_3$, or with glycidyl esters of versatic acid, and
z denotes 1 to 5.

7. An aminourethane as claimed in claim 1, wherein the chain-stoppers (D) are monocarbonates, monoepoxides, partially blocked polyisocyanates or compounds which contain amino groups and have only one primary amino group.

8. An aminourethane as claimed in claim 7, wherein the chain-stoppers (D) have the formula (VI)

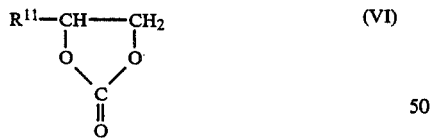
(VI)

in which R$^{11}$ represents hydrogen, alkyl having 1 to 18, preferably 1 to 10, carbon atoms or radicals of versatic acid glycidyl ester, glycidyl esters or glycidyl ethers.

9. A curable compound as claimed in claim 1, wherein the amount of (A) is 5 to 60 mol %, that of (B) is 0 to 60 mol %, that of (C) is 25 to 70 mol % and that of (D) is 0 to 70 mol %.

10. An aminourethane as claimed in claim 1, which has the formula (VII)

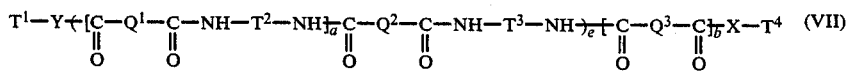
(VII)

in which
a, b and e denote a number from 0 to 5, b being ≧1 if e is 0, and 0, being ≦a and b ≦5 if e is ≧1,
X denotes —NH—M—NH—, if b≧1, or denotes a chemical bond if b is 0,
Y denotes —HN—M—NH—, or denotes a chemical bond if T$^1$ has the meaning indicated below under T$c'$),
M denotes

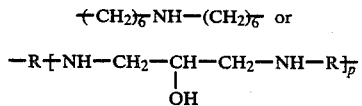

in which p is 1 to 5 and
R has the same meaning as in claim 1,
T$^1$ and T$^4$, which can be identical or different, denote
(a)

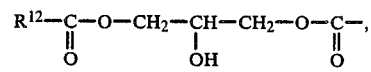

in which R$^{12}$ is (C$_5$–C$_{15}$)-alkyl, preferably branched, or
(b)

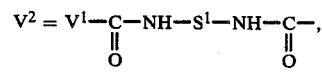

wherein V$^1$ denotes an organic radical of an H-active compound of the formula H-V$^1$ belonging to the group comprising aliphatic, cycloaliphatic, alkyl-aromatic monohydric alcohols or monohydric alcohols substituted by N-heterocyclic structures, the alcohols preferably having 1–15 carbon atoms, or comprising (C$_2$–C$_5$) alcohols which are substituted by amino groups, (C$_1$–C$_6$)-alkoxy groups, phenoxy groups or substituted phenoxy groups, or comprising the oximes of aliphatic (C$_3$–C$_8$) ketones, or heterocyclic NH acid compounds having up to 8 carbon atoms, or CH acid compounds having up to 8 carbon atoms, and S$^1$ represents a 2,4-disubstituted and/or 2,6-disubstituted toluylene radical or the methylenetrimethylcyclohexyl radical of the formula

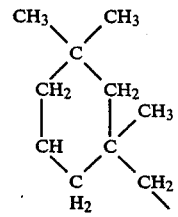

or
(c) a radical of the formulae (Ia) or (IIa), subject to the proviso that each of X or Y in formula (VII) represents a chemical bond and b is ≧1,

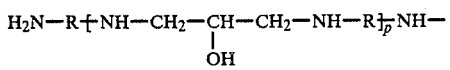  (Ia)

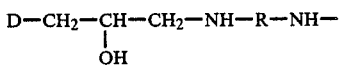  (IIa)

in which R, D and p have the same meanings as in formulae (I) and (II), or (d)

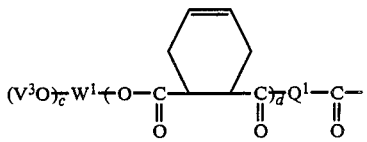

in which c is 1–3, d is 0 or 1, $V^3$ is hydrogen or $V^2$, $V^2$ having the meaning indicated above under (b), $W^1$ is a divalent to tetravalent radical from the group comprising linear or branched aliphatic polyester-alcohols having average molecular weights of up to 1,000, or radicals of trimethylolpropane, pentaerythritol, ethylene glycol, propylene glycol or trihydroxy-functional polycaprolactone, or (e) $T^1$ is hydrogen if Y is —NH—M—NH—, and $T^4$ is hydrogen if b is O and X represents a chemical bond, $T^2$ and $T^3$ are M or a linear aliphatic polyether radical having an average molecular weight of up to 400, it being possible for $T^2$ and $T^3$ to be identical or different, $Q^1$ and $Q^3$ are

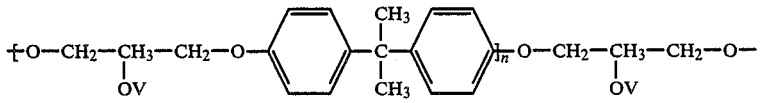

in which n is 1–3, it being possible for $Q^1$ and $Q^3$ to be identical or different, $V^3$ is hydrogen or $V^2$, $V^2$ having the meaning indicated above under (b), and $Q^2$ is

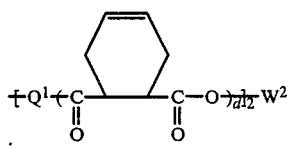

in which d is 0 or 1 and $W^2$ is a divalent radical belonging to the group comprising linear aliphatic polyester-alcohols having average molecular weights of up to 2,000, or linear or branched aliphatic polyethers having average molecular weights of up to 2,000.

11. An aminourethane as claimed in claim 10, wherein, in formula (VII), the radical R in $T^1$ and/or $T^4$ denotes a radical from a compound of the group comprising 1,6-hexanediamine in which the methyl group are optionally substituted, in addition, by one or two methyl or ethyl groups, trimethylhexamethylenediamine, 2-methylpentanediamine, 2-ethylbutanediamine, 6,6'-iminobishexylamine, 4,7-dioxadecane-1,10-diamine, 4,9-dioxadecane-1,12-diamine, 4,7,10-trioxatridecane-1,13-diamine, polyoxypropylenediamine having an average molecular weight of approx. 200–400, or ethylenediamine, 1,3-propylenediamine, 1,2-propylenediamine, 1,4-butanediamine, 1,5-pentanediamine, N,N'-dimethyl-N,N'-bis-(aminopropyl)-ethylenediamine, N-methyldipropylenetriamine or diethylenetriamine, dipropylenetriamine and higher homologous polyamines, such as pentaethylenehexamine, and also, in R, the radicals $Z^1$ and $Z^2$ represent oxygen or a divalent phenylene radical which is optionally substituted, $R^1$ to $R^6$ represent H, $CH_3$, $(C_1-C_4)$-alkylphenyl or phenyl, n, m, and l represent 0 to 6 and k represents 1 to 3, a and b represent 1 to 3 and $V^3$ represents H and/or at least in part a radical from a partially masked polyisocyanate, and $Q^1$ and $Q^3$ denote a radical from the diglycidyl ether of bisphenol A.

12. An aminourethane as claimed in claim 1, wherein some or all of the hydroxyl and/or amino groups present have been reacted with partially masked polyisocyanates.

13. An aminourethane as claimed in claim 1, wherein, in the compounds of the formula (VII), the basic amino groups have been partially or completely neutralized by acids or substances having a neutralizing action, and the aminourethanes are present in a dispersed form which can be diluted with water and deposited by electrophoresis.

14. A process for the preparation of the aminourethanes as claimed in claim 1, which comprises reacting the compounds (A) and (C) and, if appropriate, (B) and (D) in accordance with stoichiometry at temperatures between 20° and 150° C., if appropriate with the addition of catalysts.

15. The process as claimed in claim 14, wherein the reaction is carried out in the presence of inert organic solvents.

16. The process as claimed in claim 14, wherein the reaction is carried out until a constant amine number has been reached in the resulting reaction product and the cyclocarbonate content of the reaction mixture has reached the value 0.

17. The process as claimed in claim 14, wherein water-soluble acids and, if appropriate, water are added to the resulting aminourethanes, preferably dissolved in an inert, water-miscible organic solvent, with partial or complete neutralization of the basic amino groups, to such an extent that the product is obtained in a dispersed form in which it is dispersible in water and can be deposited by electrophoresis.

18. A curable mixture which contains aminourethanes as claimed in claim 1 or which has been obtained by the process as claimed in claim 15.

19. A paint formulation containing an aminoethane of claim 1 as a binder.

20. An aqueous paint formulation containing an aminourethane of claim 1 as a binder.

21. An electrodeposition paint formulation containing an aminourethane of claim 1 as a binder.

22. The formulation of claim 21 where the basic amino groups have been partially or completely neutralized.

* * * * *